(No Model.)
C. J. TAGLIABUE.
SYRINGE.
No. 325,132. Patented Aug. 25, 1885.
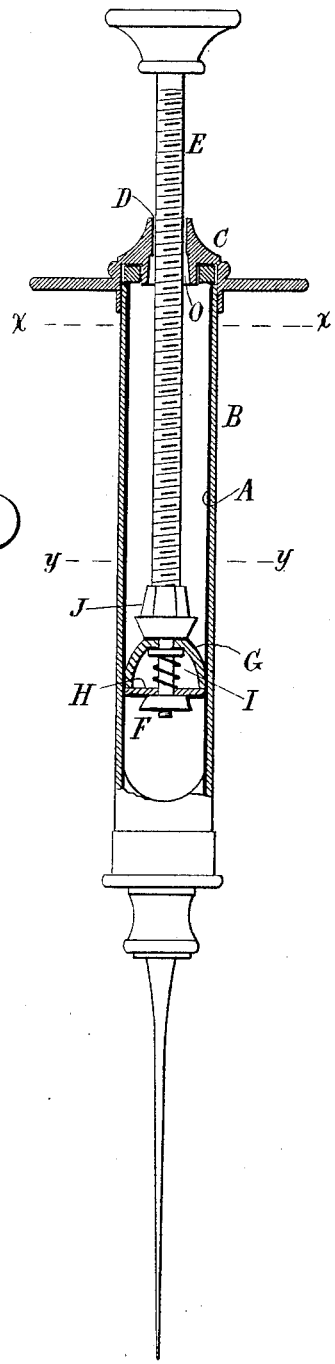
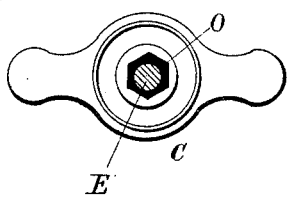
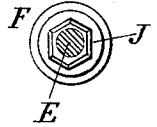
WITNESSES:
Francis C. Bowen
Thos Benson
INVENTOR
Chas J. Tagliabue
BY
Chas Wahlers.
ATTORNEY

United States Patent Office.

CHARLES J. TAGLIABUE, OF BROOKLYN, NEW YORK.

SYRINGE.

SPECIFICATION forming part of Letters Patent No. 325,132, dated August 25, 1885.

Application filed February 3, 1885. (No model.)

*To all whom it may concern:*

Be it known that I, CHARLES J. TAGLIABUE, a citizen of the United States, residing at Brooklyn, in the county of Kings and State of New York, have invented certain new and useful Improvements in Syringes, of which the following is a specification, reference being had therein to the accompanying drawings.

My invention relates to syringes for hypodermic or other uses, and especially to the construction and arrangement of the piston, with a view of permitting its adjustment to the cylinder without removal therefrom.

The object of my invention is to effect this purpose in a simple and economical manner, to which end it consists in the novel features hereinafter described, and illustrated in the accompanying drawings, in which—

Figure 1 is a longitudinal section. Fig. 2 is a cross-section on the line $x\ x$, Fig. 1, omitting the cylinder. Fig. 3 is a like section on the line $y\ y$, Fig. 1.

Similar letters indicate similar parts.

The letter A designates the glass cylinder of a hypodermic syringe inclosed within a metal shell, B, in the usual manner, this shell having openings to expose the cylinder. C denotes a cap which is screwed or otherwise attached to the rear end of the shell B and constitutes a head to the cylinder A. In this cylinder-head C is formed an axial passage, D, for the piston-rod E, carrying the piston F, which is capable of expansion in diameter, it being composed in this example of two washers, G H, one of which is cup-shaped and the other plain, and of an intermediate spring, I.

The piston-rod E is screw-threaded, and upon it is arranged a jam-nut, J, to act on the piston for the purpose of adjusting it, as hereinafter explained. The jam-nut J is constructed in form of a tapering polygon—namely, on that portion thereof facing the cylinder-head C—and the axial passage D of the cylinder-head is provided on the inner end with a socket, O, of corresponding shape to the nut, so that this socket is adapted to receive the nut within it.

When it is desired to adjust the piston in relation to the cylinder, the piston-rod E is drawn in a rearward direction a sufficient distance to bring the nut J into its receiving-socket, O. The piston-rod E is then rotated, when, due to the shape of the nut and socket, the nut is held stationary, thus following the action of the thread of the piston-rod and taking a proper position to act on the piston in the required manner, a rotation of the piston-rod in one direction causing the nut to approach the piston and in the other direction to recede therefrom, thereby compressing and expanding the piston or allowing it to contract under the impulse of its spring, as the case may be, both operations being performed without removing the piston from the cylinder.

The shape of the nut J and its receiving-socket is an important feature of my invention; but it should be understood that such may be varied—as, for example, the nut may be provided with projections, either radial or otherwise, to enter suitable recesses in the cylinder-head.

I do not claim, broadly, an expansible piston nor a jam-nut for adjusting it to the cylinder, the important feature of my invention being the means whereby the nut may be held stationary in the rotation of the piston-rod for the purpose of effecting the desired adjustment, as herein described.

What I claim as new, and desire to secure by Letters Patent, is—

1. In combination with the screw-threaded piston-rod, the expansible piston, and the jam-nut fitted on the piston-rod to act on the piston, the cylinder-head having the axial passage for the piston-rod provided with a socket to receive the jam-nut and hold it stationary in the rotation of the piston-rod, substantially as shown and described.

2. The screw-threaded piston-rod, the expansible piston, and the jam nut arranged on the piston-rod to act on the piston, and constructed in form of a tapering polygon, in combination with the cylinder-head having the axial passage for the piston-rod, provided with a socket of corresponding form to the jam-nut to receive the latter and hold it stationary in the rotation of the piston-rod, substantially as described.

In testimony whereof I hereto affix my signature in presence of two witnesses.

CHARLES J. TAGLIABUE.

Witnesses:
 CHAS. WAHLERS,
 JAS. S. EWBANK.